US012657317B2

(12) United States Patent

Matsumoto et al.

(10) Patent No.: US 12,657,317 B2

(45) Date of Patent: Jun. 16, 2026

(54) INFORMATION CONCEALING METHOD, INFORMATION PROCESSING DEVICE, AND INFORMATION PROCESSING SYSTEM

(71) Applicant: Sony Group Corporation, Tokyo (JP)

(72) Inventors: Kenichi Matsumoto, Kanagawa (JP); Yuji Saitou, Tokyo (JP)

(73) Assignee: Sony Group Corporation, Tokyo (JP)

( * ) Notice: Subject to any disclaimer, the term of this patent is extended or adjusted under 35 U.S.C. 154(b) by 18 days.

(21) Appl. No.: 18/839,680

(22) PCT Filed: Feb. 22, 2023

(86) PCT No.: PCT/JP2023/006395

§ 371 (c)(1),
(2) Date: Aug. 19, 2024

(87) PCT Pub. No.: WO2023/171379

PCT Pub. Date: Sep. 14, 2023

(65) Prior Publication Data

US 2025/0165628 A1     May 22, 2025

(30) Foreign Application Priority Data

Mar. 7, 2022  (JP) ................................. 2022-034421

(51) Int. Cl.
| | |
|---|---|
| *G06F 21/62* | (2013.01) |
| *G06F 21/31* | (2013.01) |
| *G06T 11/60* | (2006.01) |
| *G06V 10/764* | (2022.01) |

(52) U.S. Cl.
CPC .............. *G06F 21/62* (2013.01); *G06F 21/31* (2013.01); *G06T 11/60* (2013.01); *G06V 10/764* (2022.01)

(58) Field of Classification Search
CPC ....... G06F 21/62; G06F 21/31; G06V 10/764; G06T 11/60
See application file for complete search history.

(56) References Cited

U.S. PATENT DOCUMENTS

| | | | | |
|---|---|---|---|---|
| 10,579,902 B2 * | 3/2020 | Lim | ........................ | G06N 3/084 |
| 10,742,633 B2 * | 8/2020 | Chen | ........................ | H04L 63/10 |
| 10,963,681 B2 * | 3/2021 | Madden | ............... | G06V 40/161 |
| 11,516,541 B2 * | 11/2022 | Park | ...................... | H04L 9/0637 |
| 12,056,247 B2 * | 8/2024 | Youssefi | ................. | G06F 16/90 |

(Continued)

FOREIGN PATENT DOCUMENTS

| | | |
|---|---|---|
| JP | 2007148510 A | 6/2007 |
| JP | 2020021148 A | 2/2020 |

(Continued)

OTHER PUBLICATIONS

International Search Report (PCT/ISA/210), International Application No. PCT/JP2023/006395, dated May 16, 2023.

*Primary Examiner* — Viral S Lakhia

(74) *Attorney, Agent, or Firm* — Michael Best & Friedrich LLP

(57) ABSTRACT

An information concealing method according to an aspect of the present disclosure includes determining, according to a correspondence relationship between an attribute of an operator who operates a remote operation target and an attribute of a company, a disclosure range of an image related to work to be performed by the remote operation target to the operator.

20 Claims, 6 Drawing Sheets

(56)  References Cited

U.S. PATENT DOCUMENTS

| 12,124,980 | B2 * | 10/2024 | Mossoba ................ | G06N 20/00 |
| 12,300,077 | B2 * | 5/2025 | Kawai ..................... | A47F 9/047 |
| 2019/0197516 | A1 * | 6/2019 | Gosalia ............. | G06Q 20/3274 |
| 2019/0228596 | A1 * | 7/2019 | Mondello ................ | G06N 3/09 |
| 2020/0120091 | A1 * | 4/2020 | Cinelli ............... | H04L 63/1483 |
| 2020/0406664 | A1 * | 12/2020 | Munoz Utiel ......... | G07D 11/30 |
| 2021/0303717 | A1 * | 9/2021 | Neves ..................... | G06F 21/32 |
| 2022/0327315 | A1 * | 10/2022 | Kumar .................. | H04N 23/60 |
| 2024/0267223 | A1 * | 8/2024 | Suzuki ..................... | H04L 9/32 |

FOREIGN PATENT DOCUMENTS

| WO | 2019093386 | A1 | 5/2019 |
| WO | 2020202750 | A1 | 10/2020 |

* cited by examiner

INFORMATION CONCEALING METHOD, INFORMATION PROCESSING DEVICE, AND INFORMATION PROCESSING SYSTEM

FIELD

The present disclosure relates to an information concealing method, an information processing device, and an information processing system.

BACKGROUND

In recent years, techniques have been developed to allow an operator to remotely control an operation target, such as a robot, to perform work. In this remote work, when an on-site video is transmitted from a company to an operator such as a remote worker, information that the company desires to conceal can be transmitted at the same time. In relation to such circumstances, for example, Patent Literature 1 proposes a mechanism for outputting image data subjected to display restriction processing to a terminal on a remote operation side in consideration of protection of privacy for service users.

CITATION LIST

Patent Literature

Patent Literature 1: JP 2020-21148 A

SUMMARY

Technical Problem

However, the mechanism described above cannot withhold confidential information for work in which the disclosure level of the confidential information varies depending on the attribute (for example, the employment status, job type, and the like) of an operator. For this reason, there is a demand for a mechanism for withholding confidential information from an operator according to an attribute of the operator.

Therefore, the present disclosure proposes an information concealing method, an information processing device, and an information processing system that are capable of withholding confidential information from an operator according to an attribute of the operator.

Solution to Problem

An information concealing method according to an aspect of the present disclosure includes: determining, according to a correspondence relationship between an attribute of an operator who operates a remote operation target and an attribute of a company, a disclosure range to the operator, the disclosure range of an image related to work to be performed by the remote operation target.

An information processing device according to an aspect of the present disclosure includes: a disclosure range determination unit configured to determine, according to a correspondence relationship between an attribute of an operator who operates a remote operation target and an attribute of a company, a disclosure range to the operator, the disclosure range of an image related to work to be performed by the remote operation target.

An information processing system according to an aspect of the present disclosure includes: an imaging unit configured to acquire an image related to work to be performed by a remote operation target; a disclosure range determination unit configured to determine, according to a correspondence relationship between an attribute of an operator who operates the remote operation target and an attribute of a company, a disclosure range of the image to the operator; and a display unit configured to display the image based on the disclosure range.

DESCRIPTION OF EMBODIMENTS

Embodiments of the present disclosure will be described in detail below with reference to the drawings. Note that a system, an apparatus, a method, and the like according to the present disclosure are not limited by the embodiments. Furthermore, in each of the following embodiments, basically, the same reference signs are attached to the same parts, and duplicate description is omitted.

One or a plurality of embodiments (including examples and variations) to be described below can be implemented independently. In contrast, at least a part of the plurality of embodiments to be described below may be appropriately combined and implemented with at least a part of other embodiments. The plurality of embodiments can include different novel features. Therefore, the plurality of embodiments may contribute to solving different objects or problems, and may exhibit different effects.

The present disclosure will be described according to the following item order.

1. Embodiment
   1-1. Configuration example of information processing system
   1-2. Example of manufacturing process for cell pharmaceutical product
   1-3. Example of use case
   1-4. Example of disclosure range determination processing
   1-5. Effects
2. Other embodiments
3. Configuration example of hardware
4. Supplemental note

1. EMBODIMENT

1-1. Configuration Example of Information Processing System

Figure 1:
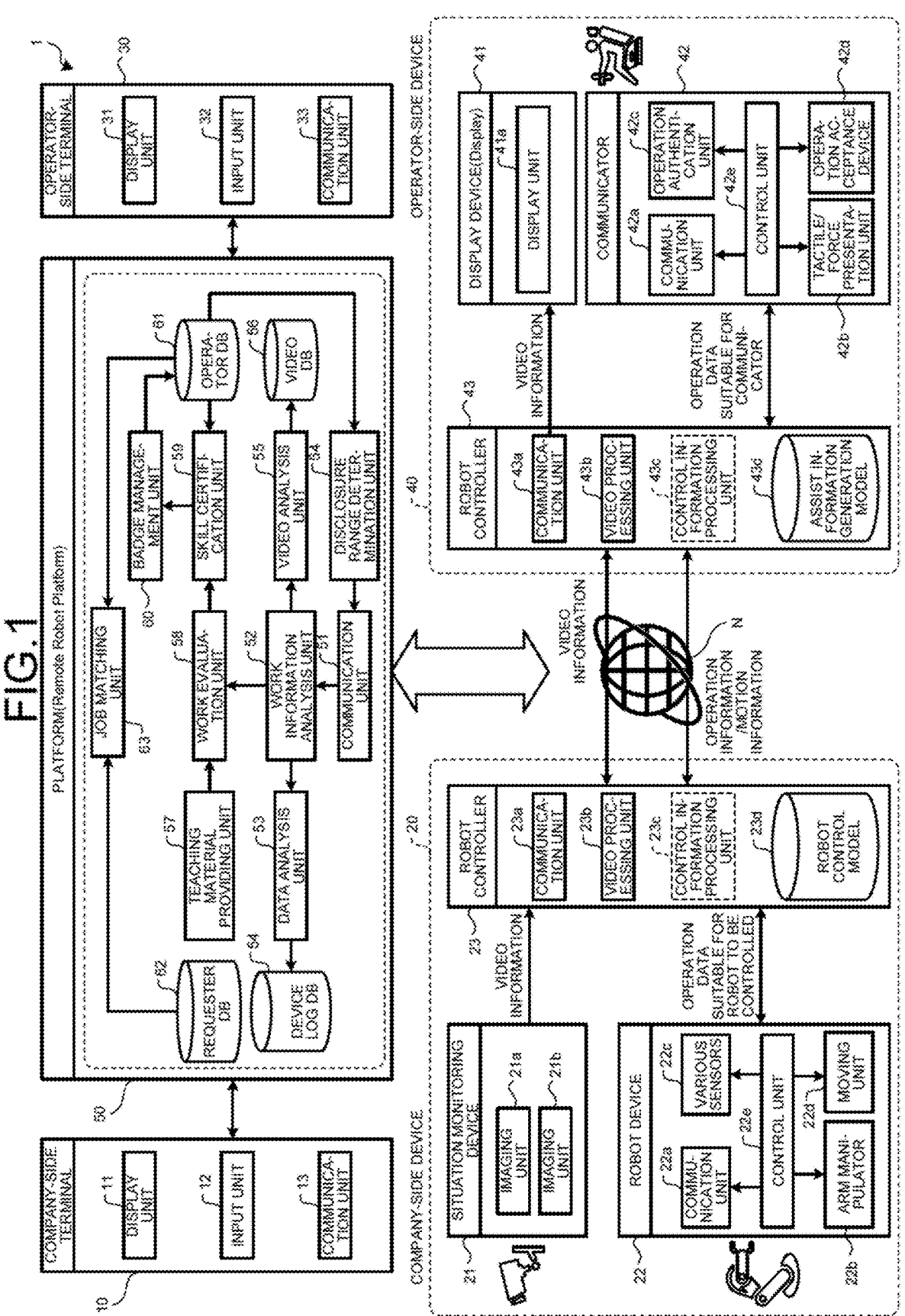
FIG. 1 is a diagram illustrating an example of a schematic configuration of an information processing system according to an embodiment of the present disclosure.

A configuration example of an information processing system 1 according to the embodiment will be described with reference to FIG. 1. FIG. 1 illustrates one example of a schematic configuration of the information processing system 1 according to the embodiment. The information processing system 1 according to the embodiment provides a remote robot control system, a workflow management system, and a job matching system.

As illustrated in FIG. 1, the information processing system 1 according to the embodiment includes a business-operator-side terminal 10, a business-operator-side apparatus 20, an operator-side terminal 30, an operator-side apparatus 40, and a remote robot platform (platform) 50. These units 10, 20, 30, 40, and 50 can communicate (transmit and receive) various pieces of information via both or one of wireless and wired networks N. Each of the units 10, 20, 30, 40, and 50 functions as an information processing apparatus. Various pieces of information are desirably transmitted and received in an encrypted manner, but this is not a limitation. Note that FIG. 1 merely illustrates an example. The units 10, 20, 30, 40, and 50 are not required to be one apparatus, but may be distributed. Furthermore, the number of the units 10, 20, 30, 40, and 50, the networks N, and the like is not limited.

A network N is a communication network such as a local area network (LAN), a wide area network (WAN), a cellular network, a fixed telephone network, a regional Internet protocol (IP) network, and the Internet. The network N may include a wired network or a wireless network. Furthermore, the network N may include a core network. The core network includes, for example, an evolved packet core (EPC) and a 5G core network (5GC). Furthermore, the network N may include a data network other than the core network. For example, the data network may be a service network of a telecommunications carrier, for example, an IP multimedia subsystem (IMS) network. Furthermore, the data network may be a private network, such as an intra-company network. Furthermore, the network N may include a software defined network (SDN).

Furthermore, a communication apparatus used for communication may be connected to the network N by using radio access technology (RAT) such as long term evolution (LTE), new radio (NR), Wi-Fi (registered trademark), and Bluetooth (registered trademark). In this case, the communications apparatus may be able to use different types of radio access technology. For example, the communication apparatus may be able to use NR and Wi-Fi. Furthermore, the communication apparatus may be able to use different types of cellular communication technology (e.g., LTE and NR). LTE and the NR are types of the cellular communication technology, and enable mobile communication of a communication apparatus by arranging a plurality of areas covered by a base station in a cell shape.

(Business-Operator-Side Terminal)

The business-operator-side terminal 10 is used by a business operator (e.g., requester and supervisor). The business-operator-side terminal 10 exchanges various pieces of information such as business-operator information and operator information with the platform 50. The business-operator information includes, for example, various pieces of information such as a business-operator identification (ID) and recruitment information. Furthermore, the operator information includes various pieces of information such as an operator ID and a skill level of an operator. The business-operator-side terminal 10 includes, for example, a personal computer (e.g., laptop computer and desktop computer), a smart device (e.g., smartphone and tablet), a personal digital assistant (PDA), and a mobile phone.

The business-operator-side terminal 10 as described above includes a display unit 11, an input unit 12, and a communication unit 13. Note that FIG. 1 illustrates a functional configuration, and a hardware configuration may be different from the functional configuration. Furthermore, the functions of the business-operator-side terminal 10 may be distributed and implemented in a plurality of physically separated configurations.

The display unit 11 is a display apparatus that displays various pieces of information. The display unit 11 includes, for example, a liquid crystal display and an organic electro luminescence (EL) display. Note that, when a touch panel is adopted as the business-operator-side terminal 10, the display unit 11 may be an apparatus integrated with an operation apparatus of the input unit 12. The display unit 11 displays various pieces of information, and provides the information to the business operator.

The input unit 12 is an input apparatus that receives various inputs from the outside. The input unit 12 includes an operation apparatus that receives an input operation of the business operator. The operation apparatus is an apparatus for a user to perform various operations, such as a keyboard, a mouse, and an operation key. Note that, when a touch panel is adopted as the business-operator-side terminal 10, the operation apparatus also includes the touch panel. In this case, the business operator performs various operations by touching a screen with his/her finger or a stylus. Furthermore, the operation apparatus may be a voice input apparatus (e.g., microphone) that receives an input operation through voice of the business operator.

The communication unit 13 is a communication interface for communicating with another apparatus. The communication unit 13 communicates with the platform 50, for example. The communication unit 13 includes, for example, various communication interfaces such as a wired interface and a wireless interface.

(Business-Operator-Side Apparatus)

The business-operator-side apparatus 20 includes a status monitoring apparatus 21, a robot apparatus 22, and a robot controller 23. Note that FIG. 1 illustrates a functional configuration, and a hardware configuration may be different from the functional configuration.

Furthermore, the functions of the business-operator-side apparatus 20 may be distributed and implemented in a plurality of physically separated configurations.

The status monitoring apparatus 21 includes a plurality of imaging units 21a and 21b. Each of the imaging units 21a and 21b is a camera that captures a video and acquires an image. For example, each of the imaging units 21a and 21b captures a bird's-eye video and a hand-side video (plurality of bird's-eye images and plurality of hand-side images). In one example, the imaging unit 21a captures a bird's-eye video, and the imaging unit 21b captures a hand-side video. Various cameras including an imaging element such as a charge-coupled device (CCD) and a complementary metal-oxide semiconductor (CMOS) can be used as the imaging units 21a and 21b.

The robot apparatus 22 includes a communication unit 22a, an arm manipulator 22b, various sensors 22c, a moving unit 22d, and a control unit 22e. The robot apparatus 22 is to be remotely operated.

The communication unit 22a is a communication interface for communicating with another apparatus. The communication unit 22a communicates with, for example, the robot controller 23. The communication unit 22a includes various communication interfaces such as a wired interface and a wireless interface.

The arm manipulator 22b is, for example, a robot arm having multiple joints (multiple shafts). The arm manipulator 22b enables work in three-dimensional space. Note that the arm manipulator 22b may include a robot hand, which is one example of an end effector. There are many types of robot hands, and the robot hands differ depending on the business contents (e.g., work contents) of the business operator.

The various sensors 22c belong to a sensor group that detects the state of the arm manipulator 22b. The various sensors 22c include various sensors that detect, for example, a torque, an angle, an angular velocity, and the like of a joint portion of an arm, a position and a speed of a distal end of the arm, a tactile sense, and a force sense. For example, the angle of the joint portion is acquired from an encoder in an actuator provided in the joint portion.

The moving unit 22d moves the arm manipulator 22b. For example, the moving unit 22d moves the arm manipulator 22b itself in a horizontal plane or a vertical plane. The moving unit 22d may move the arm manipulator 22b in a direction of one axis (X axis), two axes (XY axes), and three axes (XYZ axes). When the arm manipulator 22b does not need to be moved, the moving unit 22d is unnecessary.

The control unit 22e is a controller that controls each unit of the robot apparatus 22. The control unit 22e controls the arm manipulator 22b based on, for example, operation information transmitted from the robot controller 23. The control unit 22e is implemented by a processor such as a central processing unit (CPU) and a micro processing unit (MPU). Note that the control unit 22e may be implemented by an integrated circuit such as an application specific integrated circuit (ASIC) and a field programmable gate array (FPGA). All of the CPU, the MPU, the ASIC, and the FPGA can be regarded as controllers.

The robot controller 23 includes a communication unit 23a, a video processing unit 23b, a control information processing unit 23c, and a robot control model 23d.

The communication unit 23a is a communication interface for communicating with another apparatus. The communication unit 23a communicates with, for example, the status monitoring apparatus 21, the robot apparatus 22, the operator-side apparatus 40, and the platform 50. The communication unit 23a includes, for example, various communication interfaces such as a wired interface and a wireless interface.

The video processing unit 23b processes video information transmitted from the status monitoring apparatus 21, and transmits the video information to the communication unit 23a. For example, the video processing unit 23b encodes (e.g., encrypts or compresses) the video information transmitted from the status monitoring apparatus 21, and transmits the encoded video information to the communication unit 23a. The communication unit 23a transmits the video information to the operator-side apparatus 40, the platform 50, and the like.

The control information processing unit 23c generates operation information suitable for the robot apparatus 22 based on the operation information transmitted from the operator-side apparatus 40 or the operation information transmitted from the operator-side apparatus 40 and the robot control model 23d, and transmits the generated operation information to the robot apparatus 22. Furthermore, the control information processing unit 23c encodes (e.g., encrypts or compresses) motion information obtained from the robot apparatus 22, as necessary, and transmits the encoded motion information to the communication unit 23a. The communication unit 23a transmits the motion information to the operator-side apparatus 40, the platform 50, and the like. Furthermore, the control information processing unit 23c decodes the operation information transmitted from the operator-side apparatus 40, as necessary.

Note that the robot controller 23 can also be implemented in a form in which a software development kit (SDK) is incorporated in an existing robot control PC. In this case, executing a disclosed application programming interface (API) enables communication between the outside and the business-operator-side apparatus 20. A developer can implement a new function in an application with less effort by using the SDK, The robot control model 23d is a control information model for automatically controlling the robot apparatus 22. The robot control model 23d is stored in a storage apparatus such as a storage, and is read and used by the control information processing unit 23c.

Note that, although, in an example of FIG. 1, the business-operator-side apparatus 20 includes two imaging units (imaging units 21a and 21b) and one robot apparatus 22, the number thereof is merely an example. In practice, the imaging units 21a and 21b and the robot apparatus 22 are provided in accordance with the number of work processes, work contents, and the like, so that a large number of imaging units 21a and 21b and robot apparatuses 22 are commonly provided.

(Operator-Side Terminal)

The operator-side terminal 30 is used by an operator. The operator-side terminal 30 exchanges various pieces of information such as business-operator information and operator information with the platform 50. For example, similarly to the business-operator-side terminal 10, the operator-side terminal 30 includes a personal computer (e.g., laptop computer and desktop computer), a smart device (e.g., smartphone and tablet), a PDA, and a mobile phone.

Similarly to the business-operator-side terminal 10, the operator-side terminal 30 as described above includes a display unit 31, an input unit 32, and a communication unit 33. Note that FIG. 1 illustrates a functional configuration, and a hardware configuration may be different from the functional configuration. Furthermore, the functions of the operator-side terminal 30 may be distributed and implemented in a plurality of physically separated configurations.

The display unit 31 is a display apparatus that displays various pieces of information. The display unit 31 is, for example, a liquid crystal display and an organic EL display. Note that, when a touch panel is adopted as the operator-side terminal 30, the display unit 31 may be an apparatus integrated with an operation apparatus of the input unit 32. The display unit 31 displays various pieces of information, and provides the information to the operator.

The input unit 32 is an input apparatus that receives various inputs from the outside. The input unit 32 includes an operation apparatus that receives an input operation of the operator. The operation apparatus is an apparatus for a user to perform various operations, such as a keyboard, a mouse, and an operation key. Note that, when a touch panel is adopted as the operator-side terminal 30, the operation apparatus also includes the touch panel. In this case, the operator performs various operations by touching a screen with his/her finger or a stylus. Furthermore, the operation apparatus may be a voice input apparatus (e.g., microphone) that receives an input operation through voice of the operator.

The communication unit 33 is a communication interface for communicating with another apparatus. The communication unit 33 communicates with the platform 50, for example. The communication unit 33 includes, for example, various communication interfaces such as a wired interface and a wireless interface.

(Operator-Side Apparatus)

The operator-side apparatus 40 includes a display apparatus 41, a communicator 42, and a robot controller 43. Note that FIG. 1 illustrates a functional configuration, and a hardware configuration may be different from the functional configuration. Furthermore, the functions of the operator-side apparatus 40 may be distributed and implemented in a plurality of physically separated configurations.

The display apparatus 41 includes a display unit 41a. The display unit 41a is, for example, a liquid crystal display and an organic EL display. Although, in the example of FIG. 1, one display unit 41a is provided, this is not a limitation. A plurality of display units 41a may be provided. The display unit 41a displays various pieces of information including video information, and provides the information to the operator.

Note that the type of the display unit 41a is not particularly limited. For example, the display unit 41a may be an xR device such as an augmented reality (AR) device, a virtual reality (VR) device, and a mixed reality (MR) device. Here, the xR device may be a spectacle-type device (e.g., AR/MR/VR glasses) or a head-mounted or goggle-type device (e.g., AR/MR/VR headsets and AR/MR/VR goggles). These xR devices may display a video only to one eye, or may display a video to both eyes.

The communicator 42 includes a communication unit 42a, a tactile sense/force sense presentation unit 42b, an operation authentication unit 42c, an operation reception device 42d, and a control unit 42e. The communicator 42 is an apparatus used by the operator for a remote operation.

The communication unit 42a is a communication interface for communicating with another apparatus. The communication unit 42a communicates with, for example, the robot controller 43. The communication unit 42a includes, for example, various communication interfaces such as a wired interface and a wireless interface.

The tactile sense/force sense presentation unit 42b is an apparatus that presents a tactile sense and a force sense to the operator. This enables the operator to remotely operate the robot apparatus 22 while obtaining a tactile sense such as hardness/softness of an object and a force sense such as a force level in a case where the object is handled.

The operation authentication unit 42c authenticates an input operation of the operator to the operation reception device 42d. For example, the operation authentication unit 42c authenticates only an input operation of the operator permitted to perform an operation. Various authentication methods such as operator identification (ID) authentication, password authentication, and face authentication can be used as the authentication method.

The operation reception device 42d is an input unit that receives an input operation of the operator. The operation reception device 42d is an apparatus for the user to perform various operations, such as a handle, a joystick, a button, a keyboard, a mouse, and an operation key. The operator operates the operation reception device 42d, and remotely performs work with the robot apparatus 22. In this case, the operator operates the operation reception device 42d while looking at the display unit 41a to recognize video information.

The control unit 42e is a controller that controls each unit of the communicator 42. The control unit 42e is implemented by a processor such as a CPU and an MPU. Note that the control unit 42e may be implemented by an integrated circuit such as an ASIC and an FPGA. All of the CPU, the MPU, the ASIC, and the FPGA can be regarded as controllers.

The robot controller 43 includes a communication unit 43a, a video processing unit 43b, a control information processing unit 43c, and an assist information generation model 43d.

The communication unit 43a is a communication interface for communicating with another apparatus. The communication unit 43a communicates with, for example, the display apparatus 41, the communicator 42, the business-operator-side apparatus 20, and the platform 50. The communication unit 43a includes, for example, various communication interfaces such as a wired interface and a wireless interface.

The video processing unit 43b processes video information transmitted from the business-operator-side apparatus 20, and transmits the video information to the communication unit 43a. For example, the video processing unit 43b decodes the video information transmitted from the business-operator-side apparatus 20, as necessary, and transmits the decoded video information to the communication unit 43a. The communication unit 43a transmits the video information to the display apparatus 41. The display unit 41a displays the video information.

The control information processing unit 43c generates operation information suitable for the communicator 42 based on the assist information generation model 43d, and transmits the generated operation information to the communicator 42. Furthermore, the control information processing unit 43c encodes (e.g., encrypts or compresses) the operation information transmitted from the communicator 42, as necessary, and transmits the encoded operation information to the communication unit 43a. The communication unit 43a transmits the operation information to the business-operator-side apparatus 20, the platform 50, and the like.

The assist information generation model 43d is a model for generating assist information. The assist information is used for assisting an operation of the operator, for example. The assist information generation model 43d is stored in a storage apparatus such as a storage, and is read and used by the control information processing unit 43c.

(Platform)

The platform 50 includes a communication unit 51, a work information analysis unit 52, a data analysis unit 53, a device log database (DB) 54, a video analysis unit 55, a video DB 56, a teaching material provision unit 57, a work evaluation unit 58, a skill certification unit 59, a badge management unit 60, an operator DB 61, a requester DB 62, a job matching unit 63, and a disclosure range determination unit 64.

Note that the platform 50 is a server that manages various pieces of information, for example. For example, the platform 50 manages various pieces of information on the business-operator-side terminal 10, the business-operator-side apparatus 20, the operator-side terminal 30, and the operator-side apparatus 40, and relays exchange of the various pieces of information. For example, a cloud server, a PC server, a midrange server, and a mainframe server can be used as the server. Furthermore, the functions of the server may be configured by, for example, a plurality of servers, or may be implemented by being divided into a plurality of physically separated configurations.

The communication unit 51 is a communication interface for communicating with another apparatus. The communication unit 51 communicates with, for example, the business-operator-side terminal 10, the business-operator-side apparatus 20, the operator-side terminal 30, and the operator-side apparatus 40. The communication unit 51 includes, for example, various communication interfaces such as a wired interface and a wireless interface.

The work information analysis unit 52 analyzes the encoded work information (e.g., operation information/motion information and video information) transmitted from the communication unit 51. For example, the work information analysis unit 52 decodes the work information transmitted from the communication unit 51, as necessary. The work information analysis unit 52 transmits the decoded operation information/motion information to the data analysis unit 53, and transmits the decoded video information to the video analysis unit 55. Furthermore, the work information analysis unit 52 transmits the decoded work information to the work evaluation unit 58. Note that the work information is associated with identification information of the operator (e.g., operator ID). The work information may include identification information of the robot apparatus 22 (e.g., robot ID), as necessary.

The data analysis unit 53 analyzes the operation information/motion information transmitted from the work information analysis unit 52, and transmits analysis result information on the analysis result to the device log DB 54 together with the operation information/motion information. For example, the data analysis unit 53 analyzes whether or not the operation information/motion information is appropriate by error detection, a correction code, and the like. Furthermore, the data analysis unit 53 analyzes the operation information/motion information by machine learning (e.g., deep learning) or the like. The analysis result information is associated with an operator ID, and is associated with target operation information/motion information.

The device log DB 54 stores the analysis result information and the operation information/motion information transmitted from the data analysis unit 53 as log information. The log information is associated with an operator ID. The log information is read and used, as necessary.

The video analysis unit 55 analyzes the video information transmitted from the work information analysis unit 52, and transmits analysis result information on the analysis result to the video DB 56 together with the video information. For example, the video analysis unit 55 analyzes whether or not the video information is appropriate by error detection, a correction code, and the like. Furthermore, for example, the video analysis unit 55 has a target determination function using image recognition technology, analyzes video information by the target determination function (image recognition processing), and determines a desired object from the video information. The analysis result information is associated with an operator ID, and is associated with target video information. Note that the target determination function may be implemented by machine learning (e.g., deep learning) and the like.

The video DB 56 stores the analysis result information and the video information transmitted from the video analysis unit 55. The analysis result information and the video information are associated with the operator ID. The analysis result information and the video information are read and used, as necessary.

The teaching material provision unit 57 transmits teaching material information on a teaching material to the work evaluation unit 58. The teaching material information includes, for example, non-defective product information on a non-defective product and motion information on a motion path of the robot apparatus 22 to be a work model, and the like. The non-defective product information is, for example, range information on a specified range to be a work target. Examples of the non-defective product information include information in which the specified range is specified by a numerical value of plus or minus to a target value. Furthermore, in the motion information, the motion path is specified based on coordinates of three-dimensional space, for example. Note that the teaching material information may be obtained by machine learning, simulation, and the like.

The work evaluation unit 58 evaluates a work skill (operation skill) of the operator to the robot apparatus 22 to be remotely operated based on the teaching material information transmitted from the teaching material provision unit 57, the work information (e.g., operation information/motion information and video information) transmitted from the work information analysis unit 52, and the like, and transmits evaluation result information on the evaluation result to the skill certification unit 59. The evaluation result information is associated with the operator ID. For example, the work evaluation unit 58 compares the teaching material information with the work information to determine whether the work is good or bad (e.g., work quality), and evaluates the work skill. In the evaluation of the work skill, for example, a skill certification value for certifying the work skill of the operator is determined.

The skill certification unit 59 certifies a skill of the operator identified by the operator ID based on the evaluation result information transmitted from the work evaluation unit 58, the operator information from the operator DB 61, and the like, and transmits certification result information on the certification result to the badge management unit 60. The certification result information is associated with the operator ID.

The badge management unit 60 issues a digital badge (certification digital badge) to the operator identified by the operator ID based on the certification result information transmitted from the skill certification unit 59, and transmits badge information on a result of the issuance of the digital badge to the operator DB 61. The badge information is included in the operator information, and is associated with the operator ID. In the issuance of a digital badge, for example, the badge is issued in accordance with a skill certification value. In one example, when a skill certification value of the operator is a predetermined threshold or more, a digital badge is given to the operator. The digital badge is issued/operated without being tampered by, for example, blockchain technology.

The operator DB 61 stores operator information on the operator. The operator information includes, for example, an operator ID, profile information on the operator, work history information (operation history information) on the operator, and work environment information (operation environment information) on the operator. Each of these pieces of information is associated with the operator ID. Note that the profile information includes the badge information transmitted from the badge management unit 60. The operator information is read and used, as necessary. For example, the badge information is read from the operator DB 61 based on the operator ID and updated each time the badge management unit 60 issues a digital badge to the operator to whom the badge is to be issued. Note that the profile information on the operator, the work history information on the operator, and the work environment information on the operator will be described in detail later.

The requester DB 62 stores requester information on a requester, that is, business-operator information. The business-operator information includes, for example, business operator identification information (e.g., business operator ID) and business operator recruitment information. The business-operator information is associated with a business operator ID. The business-operator information is read and used, as necessary. The recruitment information includes various pieces of information on recruitment, such as entry conditions, work contents, and a salary.

The job matching unit 63 matches an operator (worker) with a business operator based on operator information stored in the operator DB 61 and business-operator information stored in the requester DB 62.

Examples of the business operator include a metalworking industry, a pharmaceutical manufacturing industry, and a distribution industry (example of attribute of business operator). Furthermore, examples of the operator include an operator engaged in the distribution industry, an operator engaged in a metal industry, and a skilled operator (example of attribute of operator). Examples of the skilled operator (skilled worker) include an operator engaged in a plurality of types of industries. The skilled operator is determined by years of experience, the number of badges, skills, and the like. For example, an operator having years of experience, the number of badges, the number of skills, and a skill value higher than a predetermined value is defined as a skilled operator. Note that examples of the work include various kinds of work such as various kinds of manufacturing, cutting, grinding, casting, forging, welding, and soldering.

Here, the operator information includes, for example, badge information indicating the number of badges corresponding to the operator ID. For example, a digital badge is issued to the operator for each type of industry in which the operator is engaged. One digital badge is issued to an operator who has been engaged in one type of industry and certified to be skilled in the type of industry. The digital badge proves skill certification in the type of industry in which the operator has been engaged. Furthermore, two digital badges are issued to an operator who has been engaged in two types of industries and certified to be skilled in the types of industries. The digital badges prove skill certification in each of the types of industries in which the operator has been engaged.

In matching, the job matching unit 63 selects an optimal business place from a plurality of pieces of business-operator information and introduces the business operator to the operator based on a single digital badge or a combination of digital badges. For example, each business operator sets a condition of a digital badge corresponding to a necessary skill, a desired skill, a skill value for each skill, and the like. The job matching unit 63 selects a business operator (e.g., business operator most suitable for operator), who has set a condition of a digital badge held by an operator, from a plurality of business operators, and introduces the business operator as an optimal business operator for the operator holding a single digital badge or a plurality of digital badges. An operator can achieve work matching in a new form. For example, the operator can utilize a skill which he/she has achieved in metal grinding work also in a pharmaceutical manufacturing industry (site of manufacturing of cell pharmaceutical products) different from the metalworking industry. The operator can be engaged in an industry of a type which the operator has not found successfully.

Furthermore, the job matching unit 63 introduces an optimal operator among a plurality of operators to a business operator based on a single digital badge or a combination of digital badges. The job matching unit 63 selects an operator (e.g., operator having number of digital badges and skill value exceeding predetermined value) from a plurality of operators having a single digital badge or a plurality of digital badges, and introduces the operator to the business operator as an optimal operator. The business operator can reduce adoption mismatch, and can achieve utilization for training a successor. For example, the operator introduction system can be utilized for determining which operator is optimal to succeed to a skill of a skilled operator from the relation between held digital badges.

Note that, although the job matching unit 63 introduces an optimal operator to a business operator and introduces an optimal business operator to an operator, this is not a limitation. The job matching unit 63 may introduce an appropriate single business operator or a plurality of appropriate business operators to an operator, or may introduce an appropriate single operator or a plurality of appropriate operators to a business operator. The appropriate operator is, for example, an operator holding a single digital badge or a plurality of digital badges. The optimal operator has an operator who has the number of digital badges or a skill value exceeding a predetermined value among appropriate operators. The predetermined number is preset by, for example, a business operator or the like, but may be appropriately changed. The business operator can change a predetermined value by performing an input operation on the input unit 12 of a business-operator terminal 10, for example.

The disclosure range determination unit 64 determines, according to a correspondence relationship between an attribute of an operator and an attribute of a company based on operator information stored in an operator DB 61, a disclosure range in which video information (image information) related to work to be performed by a robot device 22 is disclosed to the operator, and transmits, to a communication unit 51, disclosure range information related to the disclosure range of the video information to the operator. The disclosure range information is transmitted to an operator-side device 40 by the communication unit 51.

In the operator-side device 40, a video processing unit 43*b* processes the video information based on the disclosure range information transmitted from the communication unit 51, and transmits the processed video information to a display device 41. As the processing of the video information, for example, visual abstraction processing (for example, processing such as filling, mosaicing, or blurring) may be performed on a confidential portion that is a portion of an image other than the disclosure range. Alternatively, in a case where work is performed digitally, such as a digital twin, processing of converting the confidential portion into another object on the digital twin may be performed. For example, a target portion is digitally converted into an abstract object. In addition, processing of reproducing only a work target portion that is the disclosure range on the digital twin, that is, processing of not reproducing the non-disclosure range may be performed. In this manner, it is possible to protect confidential information.

A digital twin is a technology for reproducing various types of data collected from the real world on a computer. For example, the digital twin collects information in the real world, that is, a real (physical) space by Internet of Things (IoT) or the like, and reconstructs the real world on a computer based on the vast amount of collected information. That is, the digital twin allows various types of work to be performed by digitally existing a mirror world and utilizing 3D models constructed in them. In a case where work is performed on such a digital twin, for example, an object that is the confidential portion may be converted into an abstract object. This object conversion does not make the operation work of the operator difficult, and only makes the confidential portion invisible. The operator performs the work by operating a specific object, an abstract object, or the like on the digital twin. In addition, only a work target portion, for example, an object necessary for the work by the operator may be reproduced on the digital twin. The operator operates a specific object on the digital twin to perform the work.

Note that the processing (concealing processing) based on the disclosure range information described above is performed by the operator-side device 40, but is not limited thereto, and may be performed by, for example, a company-side device 20. In this case, the disclosure range information is transmitted from a platform 50 to the company-side device 20, and a video processing unit 23*b* of the company-side device 20 processes the video information to be transmitted to the operator-side device 40 based on the disclosure range information, and transmits the processed video information to a communication unit 23*a*. The processed video information is transmitted to the operator-side device 40 by the communication unit 23*a*. Note that the processing based on the disclosure range information may not be performed on the video information transmitted to the platform 50.

1-2. Example of Manufacturing Process for Cell Pharmaceutical Product

Figure 2:
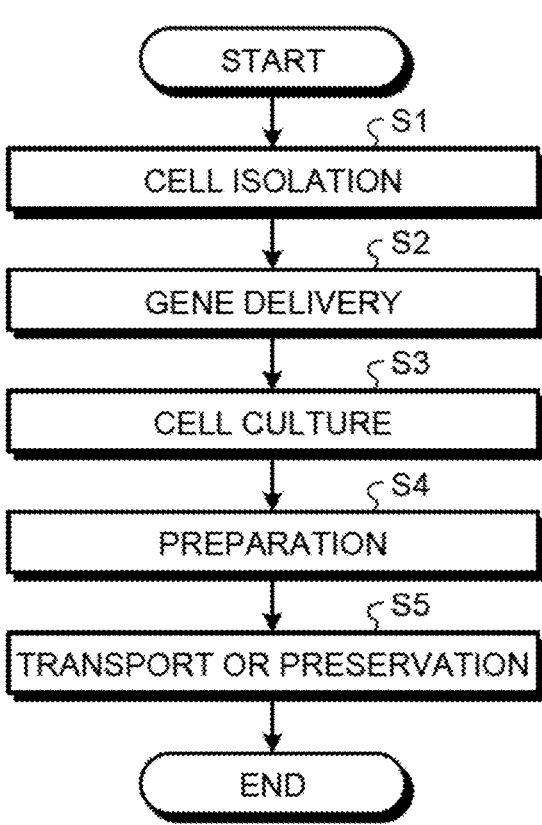
FIG. 2 is a flowchart illustrating a procedure of an example of a manufacturing process for a cell pharmaceutical product according to the embodiment of the present disclosure.

An example of a manufacturing process for a cell pharmaceutical product according to the present embodiment will be described with reference to FIG. 2. FIG. 2 is a flowchart illustrating a procedure of an example of the manufacturing process for a cell pharmaceutical product according to the present embodiment. In FIG. 2, an outline of a general manufacturing process for a cell pharmaceutical product is illustrated, and the process varies for each type of cell and each treatment.

As illustrated in FIG. 2, the manufacturing process for a cell pharmaceutical product includes a cell isolation process (step S1), a gene delivery process (step S2), a cell culture process (step S3), a preparation process (step S4), and a transport or preservation process (step S5). In these various processes (steps S1 to S5), various types of work is performed by the robot device 22 in a clean room. The robot device 22 is remotely operated to perform work. Note that a plurality of robot devices 22 may be provided in the clean room.

In the cell isolation process (step S1), work for collecting cells according to a purpose from blood of a donor or a patient is performed. In the gene delivery process (step S2), a gene according to the purpose is incorporated into the cells. In the cell culture process (step 3), cell proliferation to a required amount is performed using a microscope or a cell counting device. In the preparation process (step S4), work for making the volume and component appropriate for the pharmaceutical product is performed. In the transfer or storage process (step S5), transfer or storage to a medical institution is performed for administration to patients.

Such a series of work is performed by the robot device 22. Note that all of the series of work may be performed by the robot device 22, or a part of the series of work may be performed by the robot device 22. In addition, the movement of the workpiece and equipment setting between the processes may also be performed by the robot device 22. Note that, in order to prevent a person from entering the clean room, it is desirable that all of the work is performed by the robot device 22.

1-3. Example of Use Case

An example of a use case according to the present embodiment will be described with reference to FIG. 3. FIG.

3 is a diagram illustrating an example of a use case according to the present embodiment.

Figure 3:
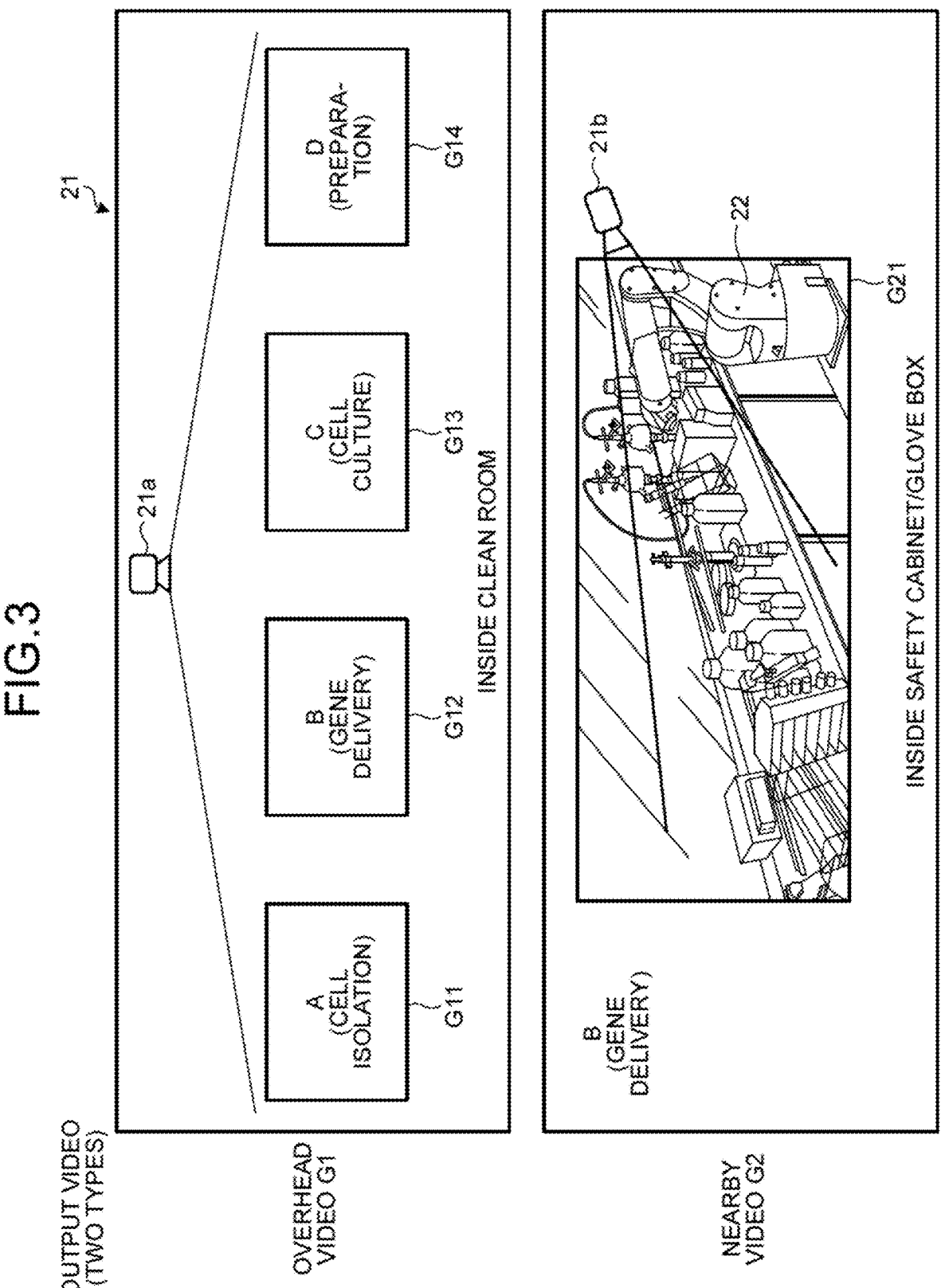
FIG. 3 is a diagram illustrating an example of a use case according to the embodiment of the present disclosure.

As illustrated in FIG. 3, a use case is assumed to be a scene in which an overhead video (overhead image) G1 and a nearby video (nearby image) G2 of a workplace are partially visually abstracted according to the attributes of an operator in pharmaceutical product manufacturing work of a certain pharmaceutical company. In the example in FIG. 3, the overhead video G1 includes various videos G11 to G14 of A (cell isolation), B (gene delivery), C (cell culture), and D (preparation) in a clean room, and the nearby video G2 includes a video G21 in a safety cabinet or a glove box of any one of A to D.

The overhead video G1 in the clean room is captured by an imaging unit 21*a* of the company-side device 20, and the nearby video G2 is captured by an imaging unit 21*b* of the company-side device 20. Note that the imaging unit 21*b* is provided for each work process, for example. Image information such as the overhead video G1 and the nearby video G2 is transmitted from the company-side device 20 to the operator-side device 40 via a network N, and is displayed by a display unit 41*a* of the operator-side device 40. While viewing the video information, the operator operates an operation acceptance device 42*d* of the operator-side device 40 to perform various types of work with the robot device 22 of the company-side device 20.

Specifically, in the cell isolation work, the operator operates the operation acceptance device 42*d* to remotely move the robot device 22 while visually recognizing the overhead video and the nearby video, and collects cells according to a purpose from blood of a donor or a patient in a storage container. In addition, in the gene delivery work, the operator operates the operation acceptance device 42*d* to remotely move the robot device 22 while visually recognizing the overhead video and the nearby video, and incorporates a gene into the cells according to the purpose. In the cell culture work, the operator operates the operation acceptance device 42*d* to remotely move the robot device 22 while visually recognizing the overhead video and the nearby video, and performs cell proliferation to a required amount using a microscope or a cell counting device. In the preparation work, the operator operates the operation acceptance device 42*d* to remotely move the robot device 22 while visually recognizing the overhead video and the nearby video, and performs work for making the volume and component appropriate for the pharmaceutical product. Note that, in the example in FIG. 3, one robot device 22 is provided, but the number of robot devices is not limited thereto, and a plurality of robot devices may be provided. Even when a plurality of robot devices 22 is provided, the operator operates the operation acceptance device 42*d* to remotely move each robot device 22 and performs various types of work.

In such remote work, it is necessary for the company to withhold confidential information (for example, personal information, information irrelevant to the work, and the like) depending on the attribute of the operator (worker). Therefore, the disclosure range determination unit 64 evaluates the skill of the operator and the environment of the operator from all the information (or a part of information) associated with the operator ID, and determines a disclosure range of the video information. At this time, the disclosure range determination unit 64 dynamically determines whether the disclosure of the confidential information of the company to the operator is not a matter, and how much information to disclose is not a matter when the confidential information is disclosed. In remote work, by withholding the confidential information included in a site video of the company according to the attribute of the operator, the disclosure range determination unit 64 can manage an information disclosure level associated with the company ID and the operator ID and dynamically determine the disclosure range of the confidential information of the company. The operator is, for example, a worker in various forms such as a regular employee, a subcontractor, a freelancer, and a retired senior skilled worker, and the operator ID includes information for distinguishing various worker forms.

For example, the disclosure range determination unit 64 may determine a uniform disclosure range for each pieces of information described above based on a setting in advance by the company. In addition, the disclosure range determination unit 64 may automatically determine or propose, according to input of information related to non-confidential information or confidential information, a non-confidential range or confidential range by using machine learning, artificial intelligence (AI), or the like. When having proposed the non-confidential range or confidential range to the operator, the disclosure range determination unit 64 may determine, for example, the proposed non-confidential range as the disclosure range or determine the proposed confidential range as the non-disclosure range according to the input operation in which the operator accepts the proposal.

In addition, the information disclosure level may be set lower in the order of, for example, a regular employee, a subcontractor, a freelancer, and a retired senior skilled worker. Alternatively, the information disclosure level may be set such that a regular employee and a subcontractor are at the same level, and a freelancer and a retired senior skilled worker are at a level lower than the level of the general employee and the subcontractor. The setting of these information disclosure levels is merely an example, and other settings may be used. For example, the information disclosure level is set in advance for each attribute of the operator, but may be appropriately changed by the company. For example, the company can change the information disclosure level by performing an input operation on the input unit 12 of a company-side terminal 10.

In addition, the disclosure range of the video information may be determined such that the size varies for each information disclosure level, for example. For example, the disclosure range of the video information may be determined so as to be narrower as the information disclosure level becomes lower, that is, so as to be wider as the information disclosure level becomes higher. For example, when the information disclosure level of a regular employee is higher than the information disclosure level of a subcontractor, the disclosure range to the regular employee is determined to be wider than the disclosure range to the subcontractor. Such a procedure for determining the disclosure range is merely an example, and other determination procedures may be used. The disclosure range is set in advance for each information disclosure level, for example, but may be appropriately changed by the company. For example, the company can change the disclosure range by performing an input operation on the input unit 12 of the company-side terminal 10.

Note that the disclosure range of the video information is at least a range necessary for work. On the other hand, the confidential range that is the non-disclosure range of the video information is a range unnecessary for the work (for example, a range irrelevant to the work). The confidential range includes, for example, personal information such as a name, a date of birth, and a blood type. In addition, the confidential range includes, for example, a work site of the same work but not related to the operator, a range of work that is not the same work, a machine/work that the company wishes to keep a trade secret, a face of a person in the site, and the like.

1-4. Example of Disclosure Range Determination Processing

Figure 4:
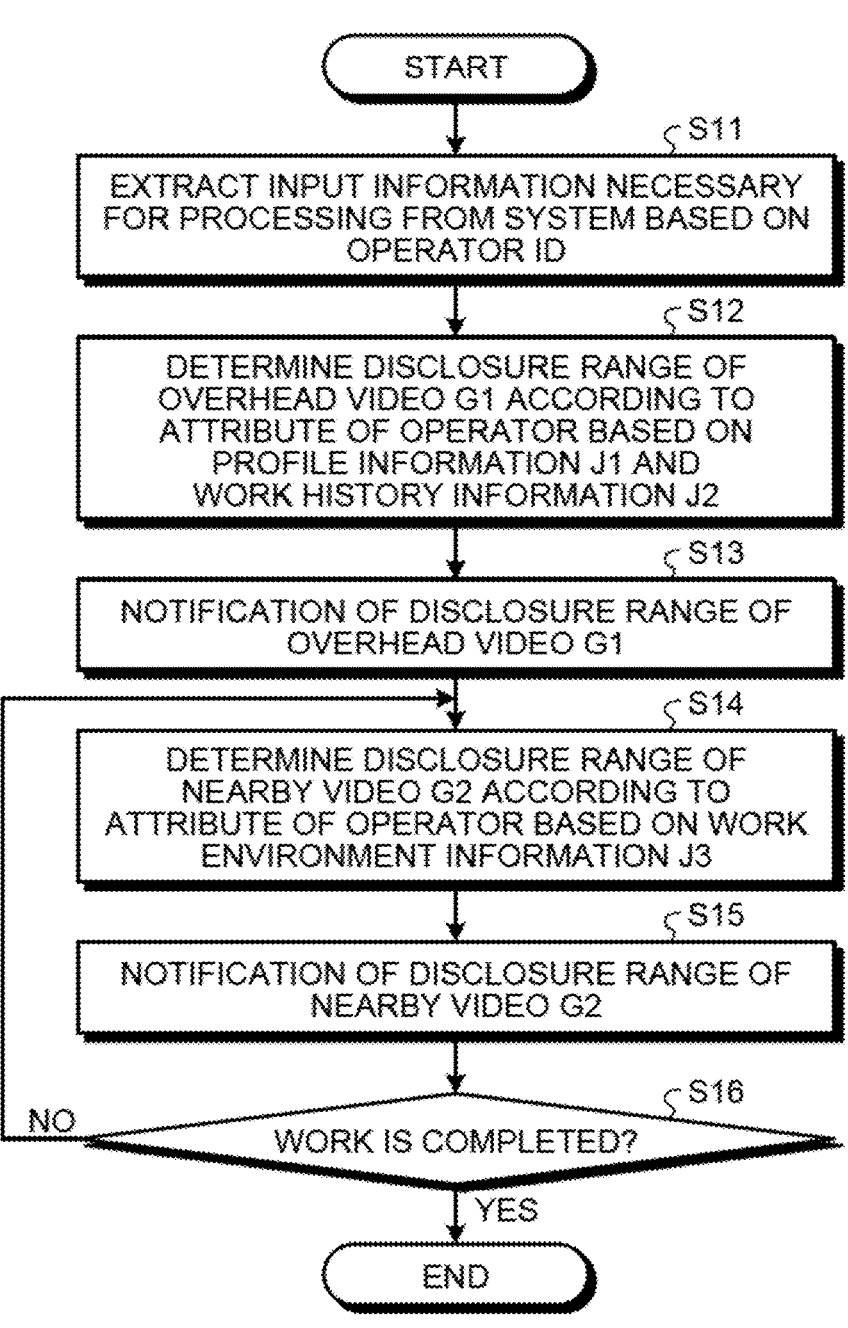
FIG. 4 is a flowchart illustrating a procedure of an example of disclosure range determination processing according to the embodiment of the present disclosure.
Figure 5:
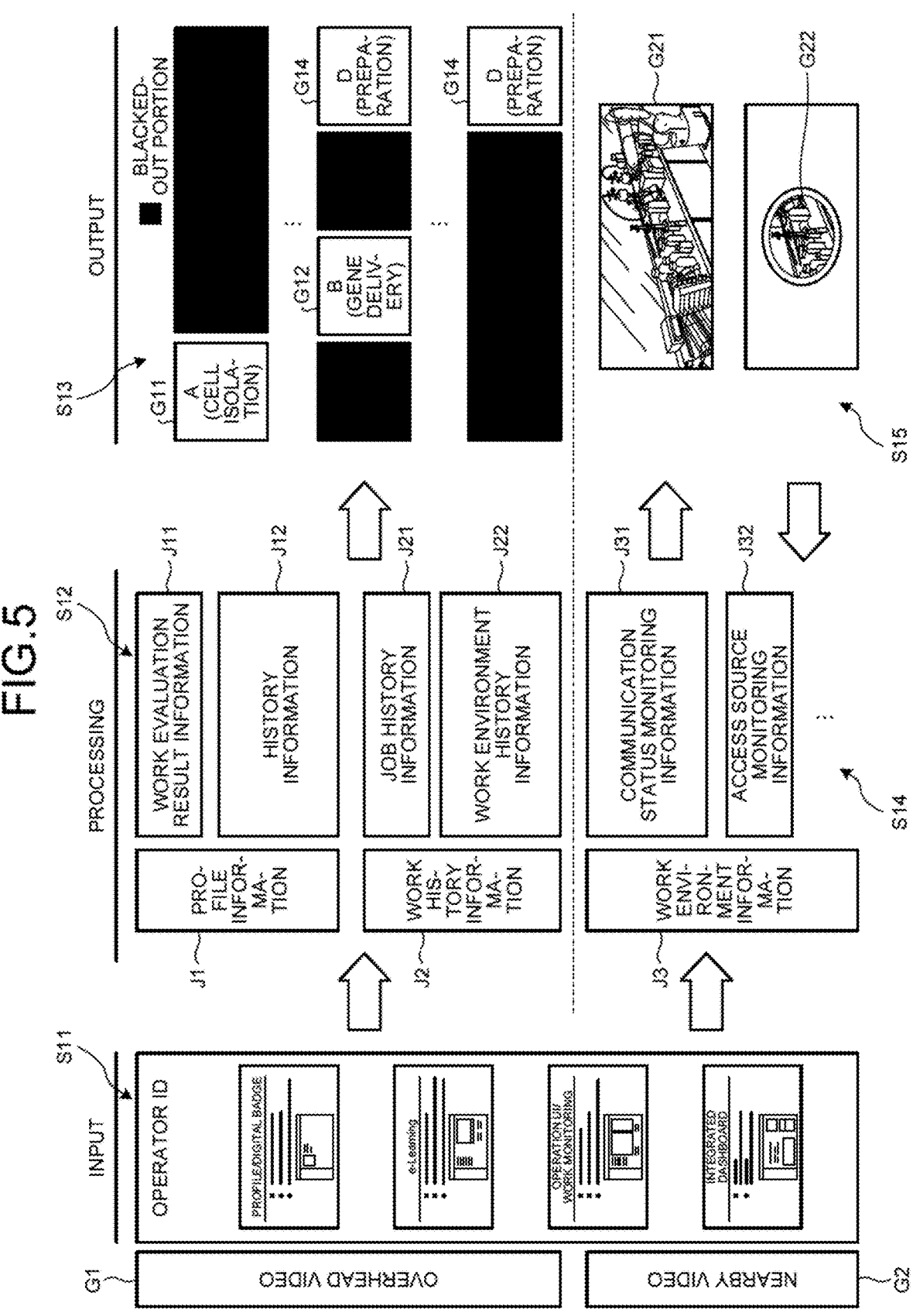
FIG. 5 is a diagram for explaining an example of the disclosure range determination processing according to the embodiment of the present disclosure.

An example of disclosure range determination processing according to the present embodiment will be described with reference to FIGS. 4 and 5. FIG. 4 is a flowchart illustrating a procedure of an example of the disclosure range determination processing according to the embodiment. FIG. 5 is a diagram for explaining an example of the disclosure range determination processing according to the embodiment of the present disclosure.

As illustrated in FIG. 4, in step S11, the disclosure range determination unit 64 extracts, based on the operator ID, input information necessary for processing from the system. In step S12, the disclosure range determination unit 64 determines a disclosure range of the overhead video G1 according to the attribute of the operator based on profile information J1 and work history information J2 on the operator. In step S13, the disclosure range determination unit 64 notifies the operator-side device 40 of disclosure range information related to the disclosure range of the overhead video G1. The operator-side device 40 performs display based on the notified disclosure range of the overhead video G1.

In step S14, the disclosure range determination unit 64 determines a disclosure range of the nearby video G2 according to the attribute of the operator based on work environment information J3 on the operator. In step S15, the disclosure range determination unit 64 notifies the operator-side device 40 of the disclosure range of the nearby video G2. The operator-side device 40 performs display based on the disclosure range of the nearby video G2. In step S16, the disclosure range determination unit 64 determines whether the work is completed, repeats steps S14 and S15 until the work is completed, and terminates the processing when the work is completed.

Here, the attribute of the operator includes, for example, an employment form, a job category, and the like, and is for determining a disclosure range of information such as the overhead video G1 and the nearby video G2. Attribute information related to the attribute of the operator includes, for example, all or any of the profile information J1, the work history information J2, and the work environment information J3 on the operator, and the attribute of the operator is defined by these pieces of information. Note that the attribute information related to the attribute of the operator may be stored in the operator DB 61 in association with the operator ID, for example.

In the flow procedure as illustrated in FIG. 4, the input information necessary for the processing is extracted from all the information associated with the operator ID in the system on the platform 50, and the processing of determining the disclosure range of the overhead video G1 and the processing of determining the disclosure range of the nearby video G2 in real time are performed on the extracted input information. Specific examples of the processing as illustrated in FIG. 4 are performed as illustrated in FIG. 5.

As illustrated in FIG. 5, in step S11, the disclosure range determination unit 64 acquires, based on the operator ID, profile information J1 and the work history information J2 on the operator from the operator DB 61 for the overhead video G1, and further acquires the work environment information J3 for the nearby video G2.

The profile information J1 is information related to the profile of the operator. The profile information J1 includes, for example, work evaluation result information J11 related to an evaluation result of work performed by an operation of the operator. The work evaluation result information J11 includes, for example, evaluation information such as comprehensive evaluation on the system or outside and evaluation for each work. The evaluation information includes, for example, badge information. Examples of the skill of the operator to be evaluated include technical skills, knowledge skills, general-purpose skills, characteristics of the operator, and the like. In addition, the profile information J1 includes, for example, history information J12 related to one or both of a learning history of the operator on the system or outside and an evaluation history of work performed by an operation of the operator. The history information J12 includes, for example, information such as a learning history in E-learning or an acquisition history of digital badges.

The work history information J2 includes, for example, job history information J21 related to a job history of the operator and work environment history information J22 related to a work environment history of the operator. The job history information J21 includes, for example, job history information and competitive information on the system. In addition, the work environment history information J22 includes, for example, information such as the degree of stability of past communications and security literacy.

The work environment information J3 includes, for example, communication status monitoring information J31 related to the communication status of a work environment and access source monitoring information J32 related to a condition of the work environment. The communication status monitoring information J31 includes, for example, information such as a communication status. In addition, the access source monitoring information J32 includes, for example, information such as whether the work environment is a conspicuous place.

In step S12, in order to identify the attribute of the operator, the disclosure range determination unit 64 evaluates the degree of reliability (in terms of software) based on, for example, the work evaluation result information J11 and the history information J12, and further performs evaluation to determine that the operator has knowledge about the handling of information in each process. In addition, based on, for example, the job history information J21 and the work environment history information J22, the disclosure range determination unit 64 evaluates the risk of leakage to competitors and further evaluates the degree of stability of past communications and security literacy. Thereafter, the disclosure range determination unit 64 determines the disclosure level of the information based on evaluation result information (attribute of the operator) related to the evaluation results, determines the disclosure range of the overhead video G1 based on the determined disclosure level of the information, and transmits the disclosure range information related to the disclosure range of the overhead video G1 to the communication unit 51.

The disclosure level (physical disclosure range and information that can be disclosed) varies depending on the attributes of the operator. For example, when the attributes of operators include a regular employee and an employee other than the regular employee, and the attribute of an operator is a regular employee, the disclosure range is wider than that when the attribute of an operator is an employee other than a regular employee. That is, the disclosure level is set higher when the attribute of an operator is a regular employee than when the attribute of an operator is an employee other than a regular employee. An employee other than a regular employee is, for example, a non-regular employee. Examples of a non-regular employee include a contract employee, and a part-timer. Note that the disclosure level is set lower in the order of a regular employee and an employee other than a regular employee, but is not limited thereto. For example, the disclosure level may be set lower in the order of a regular employee, a contract employee, a part-timer, and a part-time worker.

In step S13, the communication unit 51 notifies the operator-side device 40 of the disclosure range information on the overhead video G1. The operator-side device 40 performs display based on the disclosure range information on the overhead video G1. Note that the disclosure range information on the overhead video G1 is associated with the operator ID. That is, based on the operator ID, the communication unit 51 transmits the disclosure range information on the overhead video G1 to the operator-side device 40 corresponding to the operator ID. In the example in FIG. 5, regarding the overhead video G1, only the overhead video G11 of A (cell isolation) is determined and displayed as the disclosure range to the attribute of a certain operator. In addition, to the attribute of another operator, two overhead videos G12 and G14 of B (gene delivery) and D (preparation) are determined and displayed as the disclosure range. Furthermore, to the attribute of another operator, only the overhead video G14 of C (preparation) is determined and displayed as the disclosure range. In this manner, it is possible to withhold the confidential information from an operator according to the attribute of the operator. As a result, it is possible to reduce the risk of leakage of confidential information of the company and reduce the labor of information management of the operator.

In step S14, in order to identify the attribute of the operator, the disclosure range determination unit 64 evaluates whether a VPN connection is currently established, whether other security measures have no problems, whether the access is from a conspicuous place, and the like based on, for example, the communication status monitoring information J31 and the access source monitoring information J32. Thereafter, the disclosure range determination unit 64 determines the disclosure level of the information based on the evaluation result information (attribute of the operator), determines the disclosure range of the nearby video G2 based on the determined disclosure level of the information, and transmits the disclosure range information related to the disclosure range of the nearby video G2 to the communication unit 51.

In step S15, the communication unit 51 notifies the operator-side device 40 of the disclosure range information on the nearby video G2. The operator-side device 40 performs display based on the disclosure range information on the nearby video G2. Note that the disclosure range information on the nearby video G2 is associated with the operator ID. That is, the communication unit 51 transmits the disclosure range information to the operator-side device 40 corresponding to the operator ID associated with the disclosure range information on the nearby video G2. In the example in FIG. 5, regarding the nearby video G2, the whole video G21 of the nearby video G2 is determined and displayed as the disclosure range to the attribute of a certain operator. On the other hand, to the attributes of another operator, only a partial video G22 of the nearby video G2 is determined and displayed as the disclosure range. In addition, the disclosure range dynamically changes according to a change in the communication status or the work environment. In this manner, it is possible to withhold the confidential information from an operator according to the attribute of the operator. As a result, it is possible to reduce the risk of leakage of confidential information of the company and reduce the labor of information management of the operator.

Note that, although the disclosure range determination unit 64 determines a part of the nearby video G2 as the disclosure range, at this time, a center region of a predetermined size set in advance in the nearby video G2 may be determined as the disclosure range, or another region set in advance may be determined as the disclosure range. In addition, a desired object or a part of the desired object in the nearby video G2 may be determined as the disclosure range. For example, when the desired object is a test tube, the test tube may be set as the disclosure range, and when personal information such as a name and a blood type is on the test tube, a portion other than the personal information on the test tube may be set as the disclosure range.

In the above processing, the disclosure range of the overhead video G1 is determined using both the profile information J1 and the work history information J2, but is not limited thereto. The disclosure range of the overhead video G1 may be determined using only one of the profile information J1 and the work history information J2, or the disclosure range of the nearby video G2 may be determined using one or both of the profile information J1 and the work history information J2. In the above processing, the disclosure range of the nearby video G2 is determined using the work environment information J3, but is not limited thereto. The disclosure range of the overhead video G1 may be determined using the work environment information J3. Note that the work environment information J3 may be used to determine whether it is acceptable to transmit the overhead video G1, or when there is a security problem, a notice may be sent to review the security.

1-5. Effects

As described above, according to the present embodiment, the disclosure range determination unit 64 determines, according to a correspondence relationship between an attribute of an operator who operates a remote operation target (for example, the robot device 22) and an attribute of a company, a disclosure range to the operator, the disclosure range of an image (for example, an image included in the overhead video G1 or the nearby video G2) related to work to be performed by the remote operation target. As a result, since the disclosure range of the image is determined according to the correspondence relationship between the attribute of the operator and the attribute of the company, and only the disclosure range of the image is disclosed, it is possible to withhold confidential information related to a confidential range of the image from the operator.

In addition, the correspondence relationship described above may be an employment relationship between the operator and the company (for example, a regular employee, a non-regular employee, or the like) As a result, it is possible to appropriately determine the disclosure range of the image to the operator and reliably withhold the confidential information from the operator.

In addition, in determining the disclosure range, the disclosure range determination unit 64 may evaluate the operator based on the attribute of the operator to determine a disclosure level of the operator, and determine the disclosure range based on the determined disclosure level. As a result, it is possible to appropriately determine the disclosure range of the image to the operator and reliably withhold the confidential information from the operator.

In addition, the attribute of the operator may be an attribute based on profile information on the operator. As a result, it is possible to appropriately determine the disclosure range of the image to the operator and reliably withhold the confidential information from the operator.

In addition, the profile information may include work evaluation result information related to an evaluation result of work performed by an operation of the operator. As a result, it is possible to appropriately determine the disclosure range of the image to the operator and reliably withhold the confidential information from the operator.

In addition, the profile information may include history information related a learning history related to a learning history of the operator or an evaluation history of work performed by an operation of the operator. As a result, it is possible to appropriately determine the disclosure range of the image to the operator and reliably withhold the confidential information from the operator.

In addition, the attribute of the operator may be an attribute based on work history information related to a history of work performed by an operation of the operator. As a result, it is possible to appropriately determine the disclosure range of the image to the operator and reliably withhold the confidential information from the operator.

In addition, the work history information may include job history information related to a job history of the operator. As a result, it is possible to appropriately determine the disclosure range of the image to the operator and reliably withhold the confidential information from the operator.

In addition, the work history information may include work environment history information related to a work environment history of the operator. As a result, it is possible to appropriately determine the disclosure range of the image to the operator and reliably withhold the confidential information from the operator.

In addition, the attribute of the operator may be an attribute based on work environment information related to a work environment in which the operator performs work. As a result, it is possible to appropriately determine the disclosure range of the image to the operator and reliably withhold the confidential information from the operator.

In addition, the work environment information may include communication monitoring information related to a communication status of the work environment. As a result, it is possible to appropriately determine the disclosure range of the image to the operator and reliably withhold the confidential information from the operator.

In addition, the work environment information may include access source monitoring information related to a condition of the work environment. As a result, it is possible to appropriately determine the disclosure range of the image to the operator and reliably withhold the confidential information from the operator.

In addition, the image may include an overhead image related to the work. As a result, it is possible to appropriately determine the disclosure range of the overhead image to the operator and reliably withhold the confidential information from the operator.

In addition, the image may include an overhead image for each work. As a result, it is possible to appropriately determine the disclosure range of the overhead image for each work to the operator and reliably withhold the confidential information from the operator.

In addition, the image may include a nearby image related to the work. As a result, it is possible to appropriately determine the disclosure range of the nearby image to the operator and reliably withhold the confidential information from the operator.

In addition, the image may include a nearby image for each work. As a result, it is possible to appropriately determine the disclosure range of the nearby image for each work to the operator and reliably withhold the confidential information from the operator.

In addition, in determining the disclosure range, the disclosure range determination unit 64 may recognize a desired object from the image by image recognition processing to determine the disclosure range of the recognized desired object to the operator. As a result, it is possible to appropriately determine the disclosure range of the image to the operator and reliably withhold the confidential information from the operator.

In addition, the video processing unit 43b (or the video processing unit 23b) may perform processing of converting a portion of the image other than the disclosure range into another object on a digital twin. As a result, it possible to reliably withhold the confidential information from the operator.

In addition, the video processing unit 43b (or the video processing unit 23b) may perform processing of reproducing only a portion of the image in the disclosure range on a digital twin. As a result, it possible to reliably withhold the confidential information from the operator.

2. OTHER EMBODIMENTS

The processing according to the above-described embodiment (or variations) may be conducted in various different forms (variations) other than the above-described embodiment. For example, among pieces of processing described in the above-described embodiment, all or part of the processing described as being performed automatically can be performed manually, or all or part of the processing described as being performed manually can be performed automatically by a known method. In addition, the processing procedures, specific names, and information including various pieces of data and parameters in the above document and drawings can be optionally changed unless otherwise specified. For example, various pieces of information in each figure are not limited to the illustrated information.

Furthermore, each component of each illustrated apparatus is functional and conceptual, and does not necessarily need to be physically configured as illustrated. That is, the specific form of distribution/integration of each apparatus is not limited to the illustrated one, and all or part of the device can be configured in a functionally or physically distributed/integrated manner in any unit in accordance with various loads and use situations.

Furthermore, the above-described embodiment (or variations) can be appropriately combined as long as the processing contents do not contradict each other. Furthermore, the effects described in the present specification are merely examples and not limitations. Other effects may be exhibited.

3. CONFIGURATION EXAMPLE OF HARDWARE

Figure 6:
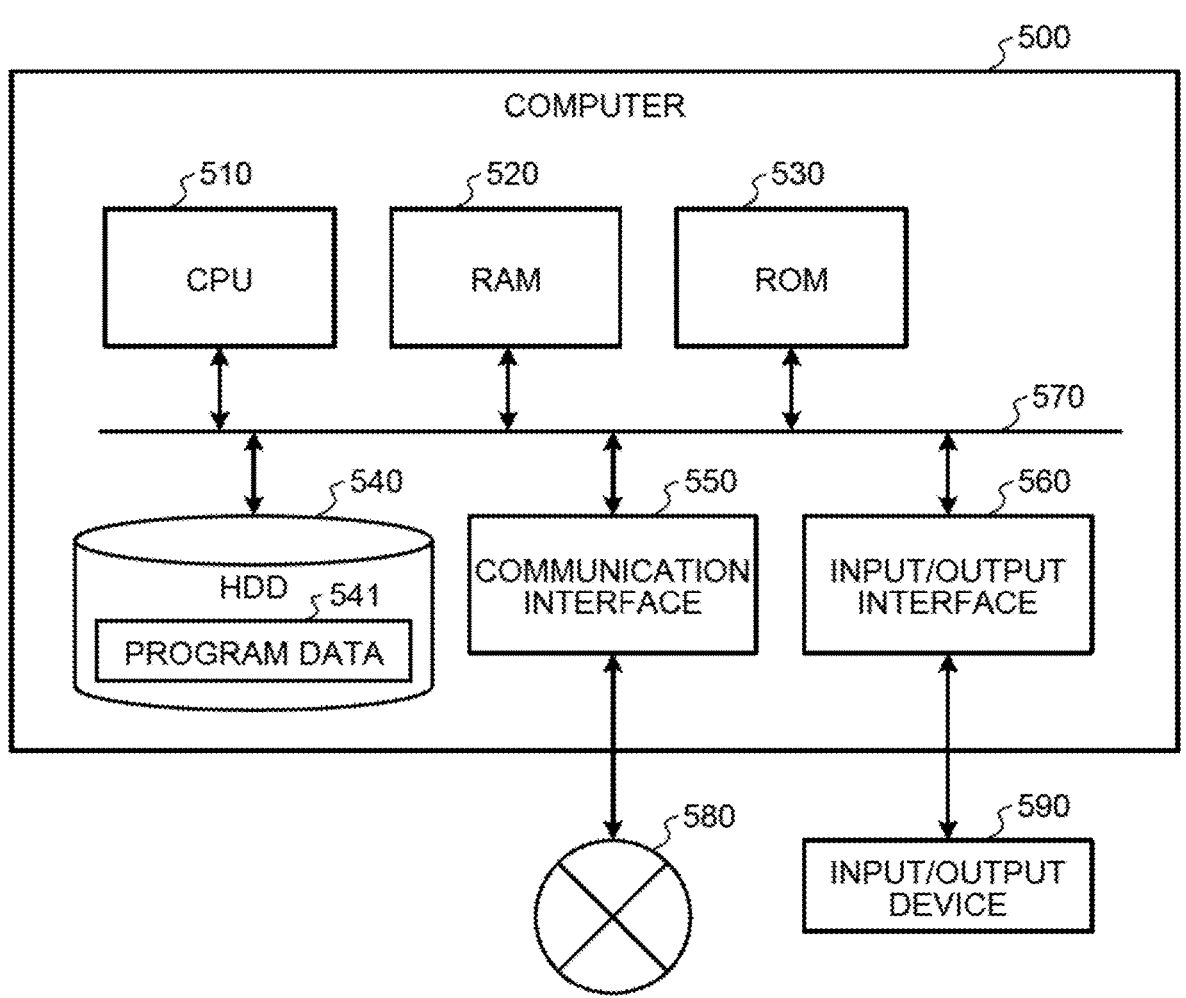
FIG. 6 is a diagram illustrating an example of a schematic configuration of hardware according to the embodiment of the present disclosure.

A specific hardware configuration example of an information device included in the business-operator-side terminal 10, the business-operator-side apparatus 20, the operator-side terminal 30, the operator-side apparatus 40, and the platform 50 according to the above-described embodiment (or variations) will be described. The information device may be implemented by, for example, a computer 500 having a configuration as illustrated in FIG. 6. FIG. 6 illustrates a configuration example of hardware that implements the functions of the information device.

As illustrated in FIG. 6, the computer 500 includes a CPU 510, a RAM 520, a read only memory (ROM) 530, a hard disk drive (HDD) 540, a communication interface 550, and an input/output interface 560. Units of the computer 500 are connected by a bus 570.

The CPU 510 operates based on a program stored in the ROM 530 or the HDD 540, and controls each unit. For example, the CPU 510 develops the program stored in the ROM 530 or the HDD 540 on the RAM 520, and executes processing corresponding to various programs.

The ROM 530 stores a boot program such as a basic input output system (BIOS) executed by the CPU 510 at the time when the computer 500 is activated, a program depending on the hardware of the computer 500, and the like.

The HDD 540 is a computer-readable recording medium that non-transiently records a program executed by the CPU 510, data used by the program, and the like. Specifically, the HDD 540 is a recording medium that records an information processing program according to the present disclosure. The information processing program is one example of program data 541.

The communication interface 550 is used for connecting the computer 500 with an external network 580 (e.g., Internet). For example, the CPU 510 receives data from another device and transmits data generated by the CPU 510 to another device via the communication interface 550.

The input/output interface 560 connects an input/output device 590 with the computer 500. For example, the CPU 510 receives data from an input device such as a keyboard and a mouse via the input/output interface 560. Furthermore, the CPU 510 transmits data to an output device such as a display, a speaker, and a printer via the input/output interface 560.

Note that, the input/output interface 560 may function as a medium interface that reads a program and the like recorded in a predetermined recording medium. Examples of the medium includes an optical recording medium such as a digital versatile disc (DVD) and a phase change rewritable disk (PD), a magneto-optical recording medium such as a magneto-optical disk (MO), a tape medium, a magnetic recording medium, and a semiconductor memory.

Here, for example, when the computer 500 functions as an information device, the CPU 510 of the computer 500 implements all or a part of the functions of each unit according to the embodiment (or variations) by executing an information processing program loaded on the RAM 520. Furthermore, the HDD 540 stores an information processing program according to the present disclosure and data. Note that the CPU 510 reads the program data 541 from the HDD 540 and executes the program data 541. In another example, the CPU 510 may acquire these programs from another apparatus via the external network 580.

4. SUPPLEMENTAL NOTE

Note that the present technique can also have the following configurations.

23

(1)

An information concealing method comprising:

determining, according to a correspondence relationship between an attribute of an operator who operates a remote operation target and an attribute of a company, a disclosure range to the operator, the disclosure range of an image related to work to be performed by the remote operation target.

(2)

The information concealing method according to (1), wherein the correspondence relationship is an employment relationship between the operator and the company.

(3)

The information concealing method according to (1) or (2), wherein in determining the disclosure range, the operator is evaluated based on the attribute of the operator to determine a disclosure level of the operator, and the disclosure range is determined based on the determined disclosure level.

(4)

The information concealing method according to any one of (1) to (3), wherein the attribute of the operator is an attribute based on profile information on the operator.

(5)

The information concealing method according to (4), wherein the profile information includes work evaluation result information related to an evaluation result of work performed by an operation of the operator.

(6)

The information concealing method according to (4) or (5), wherein the profile information includes history information related to a learning history related to a learning history of the operator or an evaluation history of work performed by an operation of the operator.

(7)

The information concealing method according to any one of (1) to (6), wherein the attribute of the operator is an attribute based on work history information related to a history of work performed by an operation of the operator.

(8)

The information concealing method according to (7), wherein the work history information includes job history information related to a job history of the operator.

(9)

The information concealing method according to (7) or (8), wherein the work history information includes work environment history information related to a work environment history of the operator.

(10)

The information concealing method according to any one of (1) to (9), wherein the attribute of the operator is an attribute based on work environment information related to a work environment in which the operator performs work.

24

(11)

The information concealing method according to (10), wherein the work environment information includes communication monitoring information related to a communication status of the work environment.

(12)

The information concealing method according to (10) or (11), wherein the work environment information includes access source monitoring information related to a condition of the work environment.

(13)

The information concealing method according to any one of (1) to (12), wherein the image includes an overhead image related to the work.

(14)

The information concealing method according to (13), wherein the image includes an overhead image for each of the work.

(15)

The information concealing method according to any one of (1) to (14), wherein the image includes a nearby image related to the work.

(16)

The information concealing method according to (15), wherein the image includes a nearby image for each of the work.

(17)

The information concealing method according to any one of (1) to (16), wherein in determining the disclosure range, a desired object is recognized from the image by image recognition processing to determine a disclosure range of the recognized desired object to the operator.

(18)

The information concealing method according to any one of (1) to (17), further comprising performing processing of converting a portion of the image other than the disclosure range into another object on a digital twin.

(19)

The information concealing method according to any one of (1) to (17), further comprising performing processing of reproducing only a portion of the image in the disclosure range on a digital twin.

(20)

An information processing device comprising:

a disclosure range determination unit configured to determine, according to a correspondence relationship between an attribute of an operator who operates a remote operation target and an attribute of a company, a disclosure range to the operator, the disclosure range of an image related to work to be performed by the remote operation target.

(21)

An information processing system comprising:

an imaging unit configured to acquire an image related to work to be performed by a remote operation target;

a disclosure range determination unit configured to determine, according to a correspondence relationship between an attribute of an operator who operates the remote operation target and an attribute of a company, a disclosure range of the image to the operator; and a display unit configured to display the image based on the disclosure range.

25

(22)

An information processing device using the information concealing method according to any one of (1) to (19).

(23)

An information processing system using the information concealing method according to any one of (1) to (19).

REFERENCE SIGNS LIST

1 INFORMATION PROCESSING SYSTEM
10 COMPANY-SIDE TERMINAL
11 DISPLAY UNIT
12 INPUT UNIT
13 COMMUNICATION UNIT
20 COMPANY-SIDE DEVICE
21 SITUATION MONITORING DEVICE
21a IMAGING UNIT
21b IMAGING UNIT
22 ROBOT DEVICE
22a COMMUNICATION UNIT
22b ARM MANIPULATOR
22c VARIOUS SENSORS
22d MOVING UNIT
22e CONTROL UNIT
23 ROBOT CONTROLLER
23a COMMUNICATION UNIT
23b VIDEO PROCESSING UNIT
23c CONTROL INFORMATION PROCESSING UNIT
23d ROBOT CONTROL MODEL
30 OPERATOR-SIDE TERMINAL
31 DISPLAY UNIT
32 INPUT UNIT
33 COMMUNICATION UNIT
40 OPERATOR-SIDE DEVICE
41 DISPLAY DEVICE
41a DISPLAY UNIT
42 COMMUNICATOR
42a COMMUNICATION UNIT
42b TACTILE/FORCE PRESENTATION UNIT
42c OPERATION AUTHENTICATION UNIT
42d OPERATION ACCEPTANCE DEVICE
42e CONTROL UNIT
43 ROBOT CONTROLLER
43a COMMUNICATION UNIT
43b VIDEO PROCESSING UNIT
43c CONTROL INFORMATION PROCESSING UNIT
43d ASSIST INFORMATION GENERATION MODEL
50 PLATFORM
51 COMMUNICATION UNIT
52 WORK INFORMATION ANALYSIS UNIT
53 DATA ANALYSIS UNIT
54 DEVICE LOG DB
55 VIDEO ANALYSIS UNIT
56 VIDEO DB
57 TEACHING MATERIAL PROVIDING UNIT
58 WORK EVALUATION UNIT
59 SKILL CERTIFICATION UNIT
60 BADGE MANAGEMENT UNIT
61 OPERATOR DB
62 REQUESTER DB
63 JOB MATCHING UNIT
64 DISCLOSURE RANGE DETERMINATION UNIT
N NETWORK

The invention claimed is:

1. An information concealing method comprising:
determining, according to a correspondence relationship between an attribute of an operator who operates a remote operation target and an attribute of a company, a disclosure range to the operator, the disclosure range being of an image related to work to be performed by the remote operation target, wherein the image comprises work-related imagery generated by one or more imaging units associated with a robot device of the remote operation target, including overhead images and nearby images, and the attributes of the operator include profile information comprising work evaluation result information, work environment history information, and current work environment information;

evaluating the operator using the profile information to determine a disclosure level of the operator; and determining the disclosure range based on the disclosure level.

2. The information concealing method according to claim 1, wherein the correspondence relationship is an employment relationship between the operator and the company.

3. The information concealing method according to claim 1, wherein the work evaluation result information includes an evaluation result of work performed by an operation of the operator.

4. The information concealing method according to claim 1, wherein the current work environment information includes communication monitoring information related to a communication status of the work environment.

5. The information concealing method according to claim 1, wherein the current work environment information includes access source monitoring information related to a condition of the work environment.

6. The information concealing method according to claim 1, wherein in determining the disclosure range, a desired object is recognized from the image by image recognition processing to determine a disclosure range of the recognized desired object to the operator.

7. The information concealing method according to claim 1, further comprising performing processing of converting a portion of the image other than the disclosure range into another object on a digital twin.

8. The information concealing method according to claim 1, further comprising performing processing of reproducing only a portion of the image in the disclosure range on a digital twin.

9. An information processing device comprising:
a memory storing a program, and
at least one processor configured to execute the program to perform operations comprising:

determining, according to a correspondence relationship between an attribute of an operator who operates a remote operation target and an attribute of a company, a disclosure range to the operator, the disclosure range being of an image related to work to be performed by the remote operation target, wherein the image comprises work-related imagery generated by one or more imaging units associated with a robot device of the remote operation target, including overhead images and nearby images, and the attributes of the operator include profile information comprising work evaluation result information, work environment history information, and current work environment information;

evaluating the operator using the profile information to determine a disclosure level of the operator; and determining the disclosure range based on the disclosure level.

10. The information processing device according to claim 9, wherein the correspondence relationship is an employment relationship between the operator and the company.

11. The information processing device according to claim 9, wherein the work evaluation result information includes an evaluation result of work performed by an operation of the operator.

12. The information processing device according to claim 9, wherein the current work environment information includes communication monitoring information related to a communication status of the work environment.

13. The information processing device according to claim 9, wherein the current work environment information includes access source monitoring information related to a condition of the work environment.

14. The information processing device according to claim 9, wherein in determining the disclosure range, a desired object is recognized from the image by image recognition processing to determine a disclosure range of the recognized desired object to the operator.

15. A non-transitory computer readable medium storing a program, the program being executable by a processor to perform operations comprising:

determining, according to a correspondence relationship between an attribute of an operator who operates a remote operation target and an attribute of a company, a disclosure range to the operator, the disclosure range being of an image related to work to be performed by the remote operation target, wherein the image comprises work-related imagery generated by one or more imaging units associated with a robot device of the remote operation target, including overhead images and nearby images, and the attributes of the operator include profile information comprising work evaluation result information, work environment history information, and current work environment information;

evaluating the operator using the profile information to determine a disclosure level of the operator; and determining the disclosure range based on the disclosure level.

16. The non-transitory computer readable medium according to claim 15, wherein the correspondence relationship is an employment relationship between the operator and the company.

17. The non-transitory computer readable medium according to claim 15, wherein the work evaluation result information includes an evaluation result of work performed by an operation of the operator.

18. The non-transitory computer readable medium according to claim 15, wherein the current work environment information includes communication monitoring information related to a communication status of the work environment.

19. The non-transitory computer readable medium according to claim 15, wherein the current work environment information includes access source monitoring information related to a condition of the work environment.

20. The non-transitory computer readable medium according to claim 15, wherein in determining the disclosure range, a desired object is recognized from the image by image recognition processing to determine a disclosure range of the recognized desired object to the operator.

* * * * *